United States Patent [19]

Kumasaka et al.

[11] Patent Number: 4,596,684
[45] Date of Patent: Jun. 24, 1986

[54] METHOD FOR MANUFACTURING LOW DENSITY RUBBER FOAMED BODY

[75] Inventors: Sadao Kumasaka, Tokyo; Shigeo Horikoshi, Kawagoe, both of Japan

[73] Assignee: Toyo Rubber Chemical Industrial Corporation, Tokyo, Japan

[21] Appl. No.: 525,613

[22] Filed: Aug. 22, 1983

Related U.S. Application Data

[63] Continuation of Ser. No. 288,407, Jul. 30, 1981, abandoned.

[51] Int. Cl.⁴ .................. B29C 67/22; C08J 3/24; C08J 9/06
[52] U.S. Cl. .................. 264/54; 264/55; 264/DIG. 5; 264/DIG. 18; 521/140
[58] Field of Search .................. 264/54, DIG. 18, 55, 264/DIG. 5; 521/140

[56] References Cited

U.S. PATENT DOCUMENTS

| | | | |
|---|---|---|---|
| 2,713,699 | 7/1955 | Pooley | 264/54 |
| 2,763,897 | 9/1956 | Gates et al. | 264/55 |
| 2,873,481 | 2/1959 | Semegen | 264/55 |
| 3,240,727 | 3/1966 | Scalari et al. | 521/140 |
| 3,341,480 | 9/1967 | Feild | 264/DIG. 18 |
| 3,812,225 | 5/1974 | Hosoda et al. | 264/54 |
| 4,338,271 | 7/1982 | Kumasaka et al. | 264/54 |

Primary Examiner—Philip Anderson
Attorney, Agent, or Firm—Frishauf, Holtz, Goodman & Woodward

[57] ABSTRACT

A method for manufacturing a low density rubber foamed body is provided which comprises the steps of forming a sheet from a mixture of 100 parts by weight of natural rubber or a synthetic rubber, 10 to 80 parts by weight of a foaming agent, and 0.5 to 15% by weight of a crosslinking agent; enclosing said sheet within a mold and heating said mold under pressure from the exterior to thereby foam said sheet; forcibly cooling said mold; and releasing a foamed body from said mold. When 10 to 60 parts by weight of a thermoplastic synthetic resin are further added to the mixture, a rubber foamed body of still lower density and lower shrinking property is obtained.

17 Claims, 5 Drawing Figures

METHOD FOR MANUFACTURING LOW DENSITY RUBBER FOAMED BODY

This is a continuation, of application Ser. No. 288,407 filed July 30, 1981 now abandoned.

BACKGROUND OF THE INVENTION

The present invention relates to a method for manufacturing a low density foamed body containing rubber as a main constituent.

A conventional method for manufacturing foamed rubber is known according to which a mixture containing rubber, a foaming agent, and a crosslinking agent is fed into a mold, the mold is heated to foam the mixture, and the produced foamed body is released from the mold. However, with a foamed body manufactured according to this method, an expansion ratio of only about 3 to 6 and a density of about 0.15 to 0.3 are obtainable. It has thus been difficult with this method to either increase the expansion ratio or two decrease the density. When the foaming agent is used in a great amount to raise the expansion ratio, the foaming pressure within the mold rises excessively when the mold is heated. Then, when the mold is opened, the foamed body immediately expands, explodes, and is scattered away.

SUMMARY OF THE INVENTION

It is an object of the present invention to provide a method for manufacturing a low density rubber foamed body.

It is another object of the present invention to provide a method for manufacturing a rubber foamed body which has a low density as well as a low shrinking property.

In order to achieve these and other objects, there is provided according to the present invention a method for manufacturing a low density rubber foamed body comprising the steps of forming a sheet from a mixture of 100 parts by weight of natural rubber or a synthetic rubber, 10 to 80 parts by weight of a foaming agent, and 0.5 to 15% by weight of a crosslinking agent; enclosing said sheet within a mold and heating said mold under pressure from the exterior to thereby foam said sheet; forcibly cooling said mold; and releasing a foamed body from said mold. When 10 to 60 parts by weight of a thermoplastic synthetic resin are further added to the mixture in the method of the present invention described above, a rubber foamed body of low density and low shrinking property is obtainable.

In accordance with the present invention, a large amount of the foaming agent may be used while preventing the drawbacks of the prior art technique such as explosion or scattering of the foamed body when the mold is opened, so that a low density rubber foamed body may be provided. A lower shrinking property may be achieved by further adding a thermoplastic synthetic resin to the raw material mixture containing natural or the synthetic rubber, the foaming agent and the crosslinking agent.

The low density rubber foamed bodies obtained according to the present invention are preferably used for various kinds of cushion materials, substitutes for springs, buoys, automobile parts, heat insulators, impact absorbers, and so on.

DETAILED DESCRIPTION OF THE PREFERRED EMBODIMENTS

Figure 1A:
FIG. 1a and FIG. 1b schematically illustrate the first and second kneading steps which can be carried out in the same or different apparatus.

The raw material rubber to be used in this invention may be natural rubber or any kind of synthetic rubber. Examples of such synthetic rubbers include acrylonitrile-butadiene rubber (NBR), chloroprene rubber (CR), isoprene rubber (IR), styrene-butadiene rubber (SBR), and ethylene-propylenediene copolymer rubber (EPDM). The foaming agent to be mixed with the rubber material may be any foaming agent which is used for manufacturing conventional rubber foamed bodies and may, for example, include azodicarbonamide, dinitrosopentamethylenetetramine, p-toluenesulfonylhydrazine, azobisisobutyronitrile, diazoaminobenzene, and toluenesulfonyl semicarbazide. The foaming agent is used in the amount of 10 to 80 parts by weight based on 100 parts by weight of the raw material rubber, although the preferred amount varies depending upon the kind of neutral or synthetic rubber to be used as the main constituent and the density of the desired foamed body. When this amount is smaller than 10 parts by weight, a sufficiently highly foamed body may not be obtained. When this amount exceeds 80 parts by weight, the foamed body may cause breakdown, or a foamed body having adequate impact resilience may not be obtained. The method also requires a crosslinking agent in addition to the foaming agent. Preferable crosslinking agents may include sulfur, zinc oxide, and organic peroxides. Examples of organic peroxides may include dicumylperoxide, 2,5-dimethyl-2,5-di(tert.-butyl)peroxide, 1,3-bis(tert.-butylperoxyisopropyl)benzene, m-octaldecylazidoformate, and tert.-butylperoxycumene. Although the amount of the crosslinking agent as mentioned above may differ depending upon the raw material rubber used, the kind and amount of foaming agent used and other conditions, it is preferably within the range of 0.5 to 15 parts by weight based on 100 parts of the raw material rubber. In addition to the foaming agent and the crosslinking agent, various other additives may optionally be added. For example, there may be added a filler such as carbon black, clay, and calcium carbonate; a foaming auxiliary such as urea, stearic acid, lauric acid, and salicylic acid; a metal oxide such as zinc oxide; and a colorant. An antioxidant may also be included. The thermoplastic synthetic resin preferably used in the present invention may include polyethylene, polypropylene, polystyrene, polyvinyl chloride, an ethylene-vinyl acetate copolymer resin, a polyamide resin and an acrylic resin. If the amount of the thermoplastic synthetic resin does not reach 10 parts by weight, satisfactory prevention of shrinkage may not be achieved. If this amount exceeds 60 parts by weight, the rubbery resilience is degraded, resulting in an unsatisfactory product.

The raw material mixture is well kneaded in a kneader such as a roll or a mixer and is formed into a sheet. For kneading the raw material, the components other than the crosslinking agent are first well kneaded with a roll at a surface temperature of 20° to 120° C. for about 15 to 60 minutes. After the crosslinking agent is added to the mixture, further kneading is performed for 5 minutes to provide a final raw material rubber sheet. Although the rubber sheet must have a thickness such that it may be put in a mold, a plurality of such rubber sheets may also be put in a single mold. Therefore, the thickness of the rubber sheet need not be the same as the size of the cavity of the mold.

The raw material rubber sheet thus obtained is placed in a mold, the lid of the mold is closed, and the mold is pressed from the upper and lower sides. The raw material rubber sheet is placed in the mold so that the rubber sheet substantially fills the cavity of the mold. The shape of the mold may be arbitrary. However, after the mold is heated under pressure for foaming the sheet and the mold is opened, the foamed body abruptly pops out of the mold while expanding in volume. Therefore, the mold preferably does not have projections within the cavity and has an upwardly flared opening. For pressing the mold from the upper and lower sides thereof, a press machine may be used. According to a further preferable method, the upper and lower halves of the mold are prefixed to the press machine, and the opening and closing of the mold is performed by vertically displacing these upper and lower halves. When placing the raw material rubber sheet which has been subjected to kneading into the mold, the sheet need not be aged in advance. Thus, the sheet may be placed directly in the mold where it is subjected to heat and pressure according to the present invention. According to the conventional method for manufacturing the rubber foamed body, in order to foam the rubber sheet which has been kneaded, aging for about 24 hours has been required before the sheet may be heated under pressure as an essential step of the method. However, this aging step is not necessary according to the present invention. Even when the raw material rubber sheet is subjected to the foaming step immediately after kneading, phenomena such as foam nonuniformity and breakdown do not occur, and continuous production is possible. After the raw material has been placed within the mold, the mold is then heated under pressure for crosslinking and foaming. Although the heating temperature is mainly determined by the decomposition temperature of the foaming agent used, it is usually 130° to 200° C. The pressure to be exerted on the mold is sufficient when it is within a range of 100 to 200 kg/cm². After foaming has proceeded substantially, the mold is cooled. The cooling temperature changes according to the raw material rubber used, the kind and amount of the foaming agent used, the kind and amount of the crosslinking agent used, and other conditions. However, it is within a range of about 50° to 100° C. The cooling method adopts forcible cooling rather than natural cooling and may, for example, adopt the process of circulating water through the jacket of the mold. Circulation of air may alternatively be adopted for this purpose. When this cooling is performed, the gas pressure generated within the mold during the heating and foaming step is reduced and the bonding between the polymer molecules is also sufficiently maintained. The mold is opened under this condition. Upon opening the mold, the rubber foamed body pops out of the mold without exploding, and the volume of the foamed body instantaneously increases more than about 15 times the original volume. Thus, the low density rubber foamed body of the present invention is obtained. The density of the resultant rubber foamed body is reduced to about 0.12 or lower.

The present invention will be more clearly understood from the following description made with reference to the examples.

EXAMPLE 1

Figure 1B:
Figure 2:
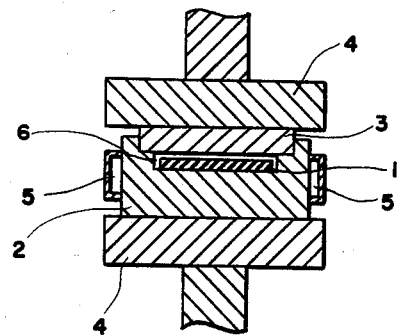
FIG. 2 is a section of the mold which contains the sheet to be foamed, positioned in a press.
Figure 3:
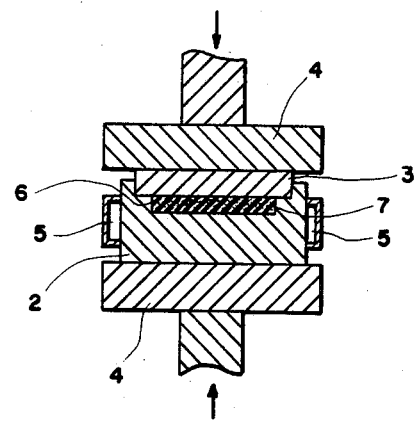
FIG. 3 is a section of the same mold positioned in the same press wherein the pressure is applied and the mold has been heated so that the unfoamed sheet has become foamed and fills the mold cavity.
Figure 4:
FIG. 4 is a section through the molded foam rubber product which has expanded greatly after release from the press.

Acrylonitrile-butadiene rubber (NBR): 100 parts by weight
Carbon black: 20 parts by weight
Stearic acid: 3.0 parts by weight
Process oil: 10 parts by weight
Dioctylphthalate: 10 parts by weight
Azodicarbonamide: 25 parts by weight
Zinc oxide: 5 parts by weight
Antioxidant (*): 1.5 parts by weight
Sulfur: 0.5 part by weight
*2,2,4-trimethyl-1,2-dihydroquinoline The components above excluding sulfur were kneaded (FIG. 1a) for 55 minutes with a roll having a surface temperature of 30° C. Sulfur was then added, and the mixture was kneaded (FIG. 1b) for 5 minutes to provide a rubber sheet 5 mm in thickness. The sheet was cut into pieces of appropriate size. Referring to FIG. 2, three such pieces 1 were placed in a mold 2 having a cavity 6 which was 150 mm in length, 230 mm in width, and 12 mm in depth. After closing the mold 2 with a lid 3, the mold 2 was pressed from the upper and lower sides thereof at a pressure of 170 kg/cm² with a press machine 4. Heated vapor was introduced in the jacket 5 of the mold 2 to heat the sides of the mold to 170° C., and the mold 2 was kept at this temperature for 10 minutes. The heated vapor in the jacket 5 was removed, and water was then introduced. After 5 minutes, the mold temperature was 85° C. The mold 2 was then opened, and the foamed body 7 in the mold 2 immediately popped out of the mold 2, providing the foamed body 8 (FIG. 3) of the present invention. The density of this foamed body 8 was 0.031. The outer appearance of the foamed body corresponded to that of the cavity 6 of the mold 2, and no cracks or explosions were observed. The cushion property and resilience of the foamed body were excellent.

EXAMPLE 2

Chloroprene rubber: 100 parts by weight
Carbon black: 20 parts by weight
Stearic acid: 3.0 parts by weight
Dioctylphthalate: 10 parts by weight
Azodicarbonamide: 16 parts by weight
Zinc oxide: 7 parts by weight
Antioxidant (*): 1.0 part by weight
Filler (Calcium carbonate): 10 parts by weight
Magnesia: 4.0 parts by weight
*N-phenyl-N'-isopropyl-p-phenylenediamine A rubber sheet 5.5 mm in thickness was obtained from the above components in a similar manner as in Example 1, except that the kneading time was 40 minutes and the roll temperature was 40° C. This rubber sheet was cut into pieces of predetermined size. Three such pieces were placed in a mold and the mold was heated under pressure in a similar manner as in Example 1. The heating temperature was 170° C., the pressure was 170 kg/cm², and the heating time was 8 minutes. The mold was cooled in a similar manner as in Example 1. The cooling time was 6 minutes and the temperature of the mold after cooling was 85° C.

The press machine was released and a low density foamed body of 0.050 density was instantaneously obtained. The outer appearance of the obtained foamed body was the same as in Example 1. The foamed body had excellent impact resilience.

EXAMPLE 3

Styrene-butadiene rubber (SBR): 100 parts by weight
Carbon black: 40 parts by weight
Stearic acid: 3.0 parts by weight
Process oil: 20 parts by weight
Azodicarbonamide: 18 parts by weight
Zinc oxide: 5 parts by weight
Antioxidant (*): 1.5 parts by weight
Sulfur: 1.2 parts by weight
*N-phenyl-N'-isopropyl-p-phenylenediamine A rubber sheet 5 mm in thickness was obtained from the above components in a similar manner as in Example 1, except that the kneading time was 30 minutes and the roll temperature was 40° C. The rubber sheet was cut into pieces of predetermined size. Three such pieces were placed in a mold and the mold was heated under pressure in a similar manner as in Example 1. The heating temperature was 150° C., the pressure was 170 kg/cm², and the heating time was 12 minutes. The mold was cooled in a similar manner as in Example 1. The cooling time was 12 minutes, and the temperature of the cooled mold was 50° C.

When the press machine was released, a low density foamed body of 0.044 density was instantaneously obtained. The outer appearance and impact resilience were like those of the foamed body obtained in Example 1.

EXAMPLE 4

Isoprene rubber (IR): 100 parts by weight
Carbon black: 40 parts by weight
Stearic acid: 3.0 parts by weight
Process oil: 20 parts by weight
Azodicarbonamide: 18 parts by weight
Zinc oxide: 5 parts by weight
Antioxidant (*): 1.5 parts by weight
Sulfur: 1.2 parts by weight
*N-phenyl-N'-isopropyl-p-phenylenediamine A rubber sheet 5 mm in thickness was obtained from the above components in a similar manner as in Example 1, except that the kneading time was 20 minutes and the roll temperature was 50° C. The rubber sheet was cut into pieces of predetermined size. Three such pieces were placed in a mold and the mold was heated under pressure in a similar manner as in Example 1. The heating temperature was 160° C., the pressure was 170 kg/cm², and the heating time was 8 minutes. The mold was then cooled in a similar manner as in Example 1, except that the cooling time was 7 minutes and the temperature of the cooled mold was 80° C.

The press machine was then released, thus providing a low density foamed body of 0.032 density. The obtained foamed body had an outer appearance and impact resilience comparable to those of the foamed body obtained in Example 1.

EXAMPLE 5

Ethylene-propylenediene copolymer rubber: 100 parts by weight
Carbon black: 15 parts by weight
Stearic acid: 2.0 parts by weight
Process oil: 10 parts by weight
Azodicarbonamide: 25 parts by weight
Zinc oxide: 5 parts by weight
Dicumylperoxide: 5.3 parts by weight A rubber sheet 5 mm in thickness was obtained from the above components in a similar manner as in Example 1, except that the kneading time was 30 minutes and the roll temperature was 50° C. The rubber sheet was cut into pieces of predetermined size. Three such pieces were placed in a mold and the mold was heated under pressure in a similar manner as in Example 1. The heating temperature was 165° C., the pressure was ⅜kg/cm², and the heating time was 14 minutes. The mold was then cooled in a similar manner as in Example 1, except that the cooling time was 3 minutes and the temperature of the cooled mold was 100° C.

The press machine was released and a low density foamed body of 0.033 density was instantaneously obtained.

EXAMPLE 6

Ethylene-propylenediene copolymer rubber: 100 parts by weight
Carbon black: 15 parts by weight
Stearic acid: 2.0 parts by weight
Process oil: 15 parts by weight
Azodicarbonamide: 35 parts by weight
Zinc oxide: 3.0 parts by weight
Dicumylperoxide: 5.3 parts by weight A rubber sheet 5 mm in thickness was obtained from the above components in a similar manner as in Example 1, except that the kneading time was 30 minutes and the roll surface temperature was 50° C. The rubber sheet was cut into pieces of predetermined size. Three such pieces were placed in a mold and the mold was cooled in a similar manner as in Example 1, except that the cooling time was 10 minutes and the temperature of the cooled mold was 90° C.

The press machine was released and a low density foamed body of 0.02 density was instantaneously obtained.

EXAMPLE 7

| | A | B |
|---|---|---|
| Styrene-butadiene rubber (SBR#1500) | 100 parts by weight | 100 parts by weight |
| Ethylene-vinyl acetate copolymer | — | 25 parts by weight |
| Zinc stearate | 3.0 parts by weight | 3.0 parts by weight |
| Zinc oxide | 5.0 parts by weight | 5.0 parts by weight |
| Carbon black | 30 parts by weight | 30 parts by weight |
| Oil (softening agent) | 15 parts by weight | 15 parts by weight |
| Azodicarbonamide | 20 parts by weight | 20 parts by weight |
| Sulfur | 1.0 part by weight | 1.0 part by weight |

Rubber sheets 2 mm in thickness were obtained from the above compositions by kneading at 50° C. for composition A and at 100° C. for composition B. The kneading time was 25 minutes in each case. The two rubber sheets were separately placed into molds having dimensions of 25 cm×25 cm×1.5 cm and having an opening flaring at an angle of 60° C., to occupy substantially 95% of the cavity of each mold. The molds were heated and pressed by press machines for 10 minutes at a heating temperature of 170° C. and a pressure of 150 kg/cm².

Water was circulated in the jackets of the molds to drop the temperature of the molds to 85° C. and this temperature was maintained for 6 minutes. The foamed bodies were then released from the molds. The foamed body of the composition A had a density of 0.048, and the foamed body of the composition B had a density of 0.052; neither foamed body exhibited cracks or foam nonuniformity. The shrinkage as measured over time was as follows. For measuring the shrinkage, a mark 10 cm in length was made on the surface of the foamed body immediately after it was released from the mold, and the shrinkage of this line was measured.

TABLE 1

Unit: cm

| | Immediately after foaming | After 6 hrs | After 12 hrs | After 24 hrs | After 3 days | After 5 days | After 10 days |
|---|---|---|---|---|---|---|---|
| A | 10 | 9.5 | 9.3 | 8.9 | 8.5 | 8.2 | 8.1 |
| B | 10 | 9.6 | 9.5 | 9.4 | 9.2 | 9.1 | 9.1 |

EXAMPLE 8

| | C | D |
|---|---|---|
| Natural rubber | 100 parts by weight | 100 parts by weight |
| Polyvinyl chloride (paste resin) | — | 40 parts by weight |
| DOP | 10 parts by weight | 25 parts by weight |
| Zinc oxide | 3.0 parts by weight | 3.0 parts by weight |
| Zinc stearate | 3.0 parts by weight | 3.0 parts by weight |
| Azodicarbonamide | 25 parts by weight | 25 parts by weight |
| Sulfur | 1.0 part by weight | 1.0 part by weight |
| Carbon black | 15 parts by weight | 15 parts by weight |

Rubber sheets 2 mm in thickness were obtained from the above compositions C and D by kneading the component mixtures at 35° C. for 35 minutes for both of the compositions. The rubber sheets were separately placed in molds as used in Example 7 to fill substantially 95% of the cavities of the molds. After heating the molds at 170° C. and at a pressure of 150 kg/cm², cold water was passed through the jackets of the molds to lower the temperature to 85° C. The molds were maintained at this temperature for 6 minutes. The foamed bodies were released from the molds. The foamed body of the composition C had a density of 0.038 and the foamed body of the composition D had a density of 0.04. The outer appearance of the foamed bodies was the same as that of the foamed bodies obtained in Example 7. The shrinkage of the foamed bodies was measured in a similar manner as in Example 7, and the obtained results are shown in Table 2 below:

TABLE 2

Unit: cm

| | Immediately after foaming | After 6 hrs | After 12 hrs | After 24 hrs | After 3 days | After 5 days | After 10 days |
|---|---|---|---|---|---|---|---|
| C | 10 | 9.6 | 9.4 | 9.2 | 8.8 | 8.6 | 8.5 |

TABLE 2-continued

Unit: cm

| | Immediately after foaming | After 6 hrs | After 12 hrs | After 24 hrs | After 3 days | After 5 days | After 10 days |
|---|---|---|---|---|---|---|---|
| D | 10 | 9.8 | 9.7 | 9.6 | 9.5 | 9.4 | 9.4 |

EXAMPLE 9

| | E | F |
|---|---|---|
| Chloroprene rubber | 100 parts by weight | 100 parts by weight |
| Polyethylene | — | 20 parts by weight |
| Zinc stearate | 3.0 parts by weight | 3.0 parts by weight |
| Zinc oxide | 4.0 parts by weight | 4.0 parts by weight |
| Carbon black | 20 parts by weight | 20 parts by weight |
| Calcium carbonate | 10 parts by weight | 10 parts by weight |
| Oil (softening agent) | 10 parts by weight | 10 parts by weight |
| Azodicarbonamide | 20 parts by weight | 20 parts by weight |

Rubber sheets 2 mm in thickness were obtained by kneading the above components at 50° C. for composition E and at 110° C. for composition F for 25 minutes each. These rubber sheets were placed in molds as used in Example 7 to occupy substantially 95% of the cavities of these molds. The molds were then heated at 170° C. and pressed at 150 kg/cm² for 6 minutes. Cold water was then passed through the jackets of the molds to cool them to 85° C. The molds were maintained at this temperature for 6 minutes. The density of the obtained product was 0.07 for the composition E and 0.073 for the composition F. The outer appearance of the foamed bodies was the sme as that obtained in Example 7. The shrinkage of the foamed bodies were measured in a similar manner as in Example 7, and the obtained results are shown in Table 3 below:

TABLE 3

Unit: cm

| | Immediately after foaming | After 6 hrs | After 12 hrs | After 24 hrs | After 3 days | After 5 days | After 10 days |
|---|---|---|---|---|---|---|---|
| E | 10 | 9.4 | 9.2 | 8.8 | 8.3 | 8.0 | 7.8 |
| F | 10 | 9.5 | 9.3 | 9.2 | 9.1 | 9.1 | 9.05 |

EXAMPLE 10

| | G | H |
|---|---|---|
| Styrene-butadiene rubber (SBR) | 100 parts by weight | 100 parts by weight |
| Ethylene-vinyl acetate copolymer | — | 25 parts by weight |
| Zinc stearate | 3.0 parts by weight | 3.0 parts by weight |
| Zinc oxide | 5.0 parts by weight | 5.0 parts by weight |
| Carbon black | 50 parts by weight | 50 parts by weight |
| Oil (softening agent) | 20 parts by weight | 20 parts by weight |
| Azodicarbonamide | 12 parts by weight | 12 parts by weight |
| Sulfur | 1.0 part by weight | 1.0 part by weight |

Rubber sheets 2 mm in thickness were obtained by kneading the above components by a roll at 50° C. for composition G and at 100° C. for composition H for 30 minutes each. These rubber sheets were separately placed in molds as used in Example 7 to occupy substantially 95% of the cavities of the molds. The molds were heated and pressed at 170° C. and 150 kg/cm² for 10 minutes by a press machine. Cold water was passed through the jackets of the molds to cool the molds to 85° C. The molds were kept at this temperature for 6 minutes. The foamed bodies were released from these molds. The density of the foamed body of the composition G was 0.12 and the density of the foamed body of the composition H was 0.12. The outer appearance of these foamed bodies was the same as that obtained in Example 7. The shrinkage of these foamed bodies was measured in a similar manner as in Example 7, and the obtained results are shown in table 4 below:

TABLE 4

|   | Immediately after foaming | After 6 hrs | After 12 hrs | After 24 hrs | After 3 days | After 5 days | After 10 days |
|---|---|---|---|---|---|---|---|
| | | | | | | | Unit: cm |
| G | 10 | 9.6 | 9.4 | 9.1 | 8.6 | 8.5 | 8.4 |
| H | 10 | 9.8 | 9.7 | 9.5 | 9.3 | 9.2 | 9.2 |

What we claim is:

1. A method for manufacturing a low density rubber foamed body having a density of less than 0.12 comprising the steps of kneading a first mixture of 100 parts by weight of natural rubber or a synthetic rubber and 10 to 80 parts by weight of a foaming agent at a temperature of about 20° to 120° C., adding 0.5 to 15% by weight of a crosslinking agent to said kneaded mixture, then kneading said kneaded mixture containing said added crosslinking agent to form a second kneaded mixture, and then forming a sheet from said second kneaded mixture; encasing said sheet within a mold and heating said mold to a temperature of about 130° to 200° C. under externally applied pressure of about 100 to 200 kg/cm² to thereby foam said sheet into a foamed body; forcibly cooling said mold to a temperature of about 50° to 100° C.; and releasing said foamed body from said mold whereby said foamed body expands to become a foamed body having a density of less than 0.12 and a volume at least 15 times the volume of said sheet.

2. The method according to claim 1, wherein said first mixture further contains 10 to 60 parts by weight of a thermoplastic synthetic resin.

3. The method according to claim 1, wherein said foaming agent is one member selected from the group consisting of azodicarbonamide, dinitrosopentamethylenetetramine, p-toluenesulfonylhydrazine, azobisisobutyronitrile, diazoaminobenzene, and toluenesulfonyl semicarbazide.

4. The method according to claim 1, wherein said crosslinking agent is one member selected from the group consisting of sulfur, zinc oxide, dicumylperoxide, 2,5-dimethyl-2,5-di(tert.-butyl)peroxide, 1,3-bis(tert.-butylperoxy-isopropyl)benzene, m-octadecylazidoformate, and tert.-butylperoxycumene.

5. The method according to claim 2, wherein said thermoplastic synthetic resin is polyethylene, polypropylene, polystyrene, polyvinyl chloride, an ethylene-vinyl acetate copolymer, a polyamide resin, and an acrylic resin.

6. The method according to claim 2, wherein (1) said foaming agent is one member selected from the group consisting of azodicarbonamide, dinitrosopentamethylenetetramine, p-toluene-sulfonylhydrazine, azobisisobutyronitrile, diazoaminobenzene, and toluenesulfonylsemicarbazide; (2) said crosslinking agent is one member selected from the group consisting of sulfur, zinc oxide, dicumylperoxide, 2,5-dimethyl-2,5-di(tert.-butyl)peroxide, 1,3-bis(tert.-butylperoxy-isopropyl)benzene, m-octadecylazidoformate, and tert.-butylperoxycumene; and (3) said thermoplastic synthetic resin is selected from the group consisting of polyethylene, polypropylene, polystyrene, polyvinyl chloride, an ethylene-vinyl acetate copolymer, a polyamide resin, and an acrylic resin.

7. The method according to claim 1, wherein said rubber is a synthetic rubber selected from the group consisting of acrylonitrile-butadiene rubber, chloroprene rubber, isoprene rubber, styrene-butadiene rubber and ethylene-propylenediene rubber.

8. The method according to claim 2, wherein said rubber is a synthetic rubber selected from the group consisting of acrylonitrile-butadiene rubber, chloroprene rubber, isoprene rubber, styrene-butadiene rubber and ethylene-propylenediene rubber.

9. The method according to claim 6, wherein said rubber is a synthetic rubber selected from the group consisting of acrylonitrile-butadiene rubber, chloroprene rubber, isoprene rubber, styrene-butadiene rubber and ethylene-propylenediene rubber.

10. The method according to claim 1, wherein (1) said foaming agent is one member selected from the group consisting of azodicarbonamide, dinitrosopentamethylaenetetramine, p-toluenesulfonylhydrazine, azobisisobutyronitrile, diazoaminobenzene, and toluenesulfonylsemicarbazide; and (2) said cross-linking agent is one member selected from the group consisting of sulfur, zinc oxide, dicumylperoxide, 2,5-dimethyl-2,5-di(tert.-butyl)peroxide, 1,3-bis(tert.-butylperoxy-isopropyl)benzene, m-octadecylazidoformate, and tert.-butylperoxycumene.

11. The method according to claim 10, wherein said rubber is a synthetic rubber selected from the group consisting of acrylonitrile-butadiene rubber, chloroprene rubber, isoprene rubber, styrene-butadiene rubber and ethylene-propylenediene rubber.

12. The method according to claim 1, wherein the amount of foaming agent is from 12 to 35 parts by weight.

13. The method according to claim 2, wherein the amount of foaming agent is from 12 to 35 parts by weight.

14. The method according to claim 6, wherein the amount of foaming agent is from 12 to 35 parts by weight.

15. The method according to claim 7, wherein the amount of foaming agent is from 12 to 35 parts by weight.

16. The method according to claim 9, wherein the amount of foaming agent is from 12 to 35 parts by weight.

17. The method according to claim 11, wherein the amount of foaming agent is from 12 to 35 parts by weight.

* * * * *